United States Patent [19]

Tong et al.

[11] Patent Number: 4,780,527

[45] Date of Patent: Oct. 25, 1988

[54] PREPARATION OF POLYESTERS FROM TEREPHTHALIC ACID

[75] Inventors: Shen-Nan Tong; Mei-Sui Chen; Wu-Bin Yuo; Nien-Hsi Chang, all of Hsinchu, Taiwan

[73] Assignee: Industrial Technology Research Institute, Hsinchu, Taiwan

[21] Appl. No.: 47,421

[22] Filed: May 6, 1987

[51] Int. Cl.$^4$ .............................................. C08G 63/04
[52] U.S. Cl. .................................... 528/279; 528/283
[58] Field of Search .............................. 528/274, 283

[56] References Cited

U.S. PATENT DOCUMENTS

| | | | |
|---|---|---|---|
| 4,511,708 | 4/1985 | Kasuga et al. | 528/274 |
| 4,611,049 | 9/1986 | Kuratsuji et al. | 528/279 |
| 4,656,241 | 4/1987 | Iida et al. | 528/279 |
| 4,680,376 | 7/1987 | Heinze et al. | 528/279 |

*Primary Examiner*—Maurice J. Welsh
*Assistant Examiner*—S. A. Acquah
*Attorney, Agent, or Firm*—Bert J. Lewen; Henry Sternberg

[57] ABSTRACT

Poly(butylene terephthalate) is prepared in a two-stage process wherein terephthalic acid and 1,4-butanediol are esterified in the presence of a catalytic amount of a catalyst having an organo-metallic component which is an organo-titanate compound, an organo-tin compound or a combination thereof and a salt component which is an organic acid salt or an inorganic salt. In a second step, the esterification product is subject to polycondensation. By following the foregoing procedure, the formation of tetrahydrofuran is significantly suppressed and the percent conversion of esterification products increased.

19 Claims, No Drawings

PREPARATION OF POLYESTERS FROM TEREPHTHALIC ACID

BACKGROUND OF THE INVENTION

The present invention relates to a process for producing poly(butylene terephthalate) by the direct esterification of terephthalic acid and 1,4-butanediol.

It has long been known that 1,4-butanediol can be used as the diol component for the production of polyesters. The resulting products have been widely used because these polyesters have superior properties such as moldability, good surface characteristics, and the dimensional accuracy of molded products. Among such polyesters, the most useful one is poly(butylene terephthalate) which is effectively used as an engineering plastic for electrical components, machines, cars, sporting goods, interior decorative goods and the like.

The patent literature is replete with descriptions of preparing poly(alkylene terephthalates) by reacting an alkylene glycol with dialkyl terephthalates and/or terephthalic acid. If dialkyl terephthalate is used, the first stage of the process is an ester interchange reaction wherein the reaction is considered complete when the monohydric alcohol is substantially completely removed. If terephthalic acid is used, the first stage of the process is a polyesterification reaction. In this case, the first stage is considered complete when the cloudy reaction medium becomes clear. Terephthalic acid (TPA) is generally preferred for the production of poly(ethylene terephthalate) since terephthalic acid is less expensive on a molar basis than the dialkyl ester and because first stage polyesterification is faster than first stage ester interchange.

Numerous patents have disclosed the reaction of 1,4-butanediol with terephthalic acid to produce poly(butylene terephthalate). However, in this case, polyesterification is subject to a major disadvantage, viz., that terephthalic acid acts as a catalyst for the conversion of 1,4-butanediol to tetrahydrofuran (THF). This reduces yield and increases the production cost of the resin.

It has been proposed in U.S. Pat. No. 3,936,421 to minimize tetrahydrofuran production by esterification of terephthalic acid with 1,4-butanediol in the presence of a mixture of an organo-tin compound and an organo-titanium compound as catalyst. Example 1 shows that, by using 0.1 wt. % of tetrabutyl titanate as catalyst, the distilled water (23.0 g) contains 8.5 g of tetrahydrofuran (8.5/23=36.96% THF). Example 2 indicates that distilled water (1960 g) contains 670 g of tetrahydrofuran (e.g., 670/1960=34.18% THF).

U.S. Pat. No. 4,014,858 also discloses an attempt to minimize tetrahydrofuran production by using a tetravalent tin catalyst having one organo-tin linkage. In Examples X and XII listed in Table 1, Columns 5 and 6, 0.23 and 0.20 mole, respectively, of THF were formed per mole TPA charged to the reactor.

U.S. Pat. No. 4,329,444 teaches controlling conditions to promote rapid removal of water as formed to minimize the contact time between 1,4-butanediol and terephthalic acid. Example 1 indicates that, by using 0.18 wt. % of tetrabutyl titanate as catalyst, 0.358 mole diol may be converted to tetrahydrofuran per mole of terephthalic acid charged to the reactor. This implies that the amount of tetrahydrofuran formed was 0.358 mole THF/mole TPA. In Example 2, the amount of tetrahydrofuran (THF) formed was 0.63 mole THF/mole TPA.

U.S. Pat. No. 4,346,213 and U.S. Pat. No. 4,439,597 teach various techniques for conducting the polycondensation reaction prior to completion of the esterification/oligomerization reaction to improve yields.

Because of the disadvantage associated with the direct esterification method, the principal process for manufacturing poly(butylene terephthalate) remains the transesterification of a dialkyl terephthalate, generally dimethyl terephthalate, with 1,4-butanediol since less tetrahydrofuran is encountered by this procedure. This is so despite the work described in the aforesaid patents.

BRIEF DESCRIPTION OF THE INVENTION

The present invention relates to the esterification of terephthalic acid and 1,4-butanediol in the presence of a catalyst which comprises an organo-metallic component selected from an organo-titanium compound, an organo-tin compound, or combinations thereof, and a salt component which is an organic acid salt, inorganic salt, or combinations thereof. In this process, the undesirable formation of tetrahydrofuran is significantly suppressed and the percentage conversion in the esterification reaction is increased. In preparing the poly(butylene terephthalate), the terephthalic acid and 1,4-butanediol are reacted in the first stage at an elevated temperature in the presence of the aforesaid catalyst until the conversion reaches from 70% to 95%. Thereafter, the reaction products are further reacted in the second stage at a temperature which is higher than that of the first stage and at reduced pressure to produce the poly(butylene terephthalate).

DETAILED DESCRIPTION OF THE INVENTION

The term "poly(butylene terephthalate)" refers to a substantially linear polyester comprising units derived from terephthalic acid and 1,4-butanediol. This term also includes copolyesters in which part of the terephthalic acid is replaced by one or more other copolycondensable polycarboxylic acids and/or part of the 1,4-butanediol is replaced by one or more other copolycondensable polyols. Examples of other copolycondensable polycarboxylic acids include isophthalic acid, adipic acid, sebacic acid, azelaic acid, dodecane dicarboxylic acid, hexahydroterephthalic acid, trimellitic acid, trimesic acid and 2,6-naphthalene dicarboxylic acid. Examples of other copolycondensable polyols include ethylene glycol, 1,3-propylene glycol, neopentyl glycol, pentaerythritol, 1,6-hexanediol, polyethylene glycol and polytetramethylene ether glycol.

The organo-titanium compounds used in forming the organo-metallic component of the catalyst have the structure of $Ti(OR)_4$, wherein each R is selected from an alkyl group having from 1 to 30 carbon atoms or an aryl group having from 6 to 12 carbon atoms. The R groups may be the same or different from each other and include the hydrolyzed products and transesterified products of the aforesaid alkyl or aryl groups. Illustrative of the organo-titanium compounds are tetramethyl titanate, ethylene glycol titanate, tetrabutylene glycol titanate, tetrabutyl titanate, tetraisopropyl titanate and tetraoctyl titanate and their partially or completely hydrolyzed and their transesterified products.

The organo-tin compounds which may be used as the organo-metallic component of the catalyst include trimethyltin hydroxide, triethyltin hydroxide, triphenyltin hydroxide, triisobutyltin acetate, dibutyltin diacetate, dibutyltin diacetate, diphenyltin dilaurate, monobutyltin trichloride, dibutyltin dichloride, tributyltin chloride, methylphenyltin oxide, dibutyltin oxide, didodecyltin oxide, dibutyltin sulfide and butylhydroxytin oxide.

The organo-titanates and the organo-tin compounds may be used as the organo-metallic catalyst component alone or in combination. The amount of the organo-metallic component may be varied from 0.001 to 0.5 wt. %, preferably from 0.01 to 0.3 wt. %, based on weight of the polycarboxylic acids. Where it is desirable to use both the organo-titanate and the organo-tin compound as the organo-metallic component, they are generally used in a ratio of from 1:1 to 30:1.

The organic acid salt used in the salt component of the catalyst of the invention has the structure $R(COO)_nM$, wherein R is selected from an alkyl group having from 1 to 30 carbon atoms or an aryl group having from 6 to 12 carbon atoms. n may be 1 to 4; 1 or 2 is preferred. M is a group IA or a group IIA metal ion. Illustrative of the organic acid salt are sodium oxalate, sodium succinate, sodium adipate, sodium sebacate, potassium acetate, zinc stearate, potassium benzoate, dipotassium terephthalate, disodium 2,6-naphthalene dicarboxylate, dipotassium isophthalate, and magnesium terephthalate.

The inorganic salts used as the salt catalyst component include group IA and group IIA metal halogen compounds such as potassium chloride, zinc chloride, calcium chloride, sodium bromide; and group IA and group IIA metal salts of weak inorganic acids such as sodium bicarbonate, potassium bicarbonate, sodium carbonate, calcium carbonate, magnesium carbonate, potassium carbonate, sodium dihydrogen phosphate, sodium hydrogen phosphate, sodium phosphate, calcium hydrogen phosphate, and calcium phosphate.

These organic and inorganic salts, which form the salt catalyst component, may be used alone or in combination. The amount of the salt component may be varied from 0.001 to 0.5 wt. %, preferably from 0.005 to 0.3 wt. %, based on weight of polycarboxylic acids.

The ratio of the two catalyst components is of particular importance. Generally speaking, the ratio of the organo-metallic component to the salt component is from 1:1 to 60:1.

In the first stage reaction, the molar ratio of 1,4-butanediol to terephthalic acid is from about 1.2:1 to 2.0:1, preferably from 1.5:1 to 1.8:1. This esterification is conducted at a temperature of from about 180° C. to about 230° C., preferably at from 200° to 210° C., under atmospheric pressure, while water and a minor amount of tetrahydrofuran are being distilled from the reaction medium. When the percentage of conversion is from 70% to 95%, preferably from 75% to 85%, the reaction temperature is raised to about 235° to 260° C., preferably about 245° to 255° C., under a gradually reduced pressure of about 0.5 to 2 mm Hg until a polyester having a suitable degree of polymerization is produced. This second stage is referred to herein as the "polycondensation stage."

The invention will be further specifically described by reference to the following illustrative examples:

COMPARATIVE EXAMPLE A

This example shows the use of a catalyst having a single component. Terephthalic acid (250 g, 1.506 moles), 1,4-butanediol (230 g, 2.556 moles; TPA/BDO =1/1.7) and tetrabutyl titanate (0.5 g) are placed in a 1000 ml stainless steel reactor equipped with a short fractionation column, mechanical stirrer and nitrogen inlet. The mixture is heated at from 200° to 210° C., mechanically stirred and purged with a nitrogen stream at 25 ml/min. Water and tetrahydrofuran distillate (56.2 g) is produced for 85 min and contains 13.2 g of tetrahydrofuran. This is equivalent to the formation of 23.5% or 0.122 mole of THF for each mole of TPA charged to the reactor. This distillate contains the water of condensation from the esterification reaction and the water and THF formed by the dehydration of the 1,4-butanediol.

The reaction products of the aforesaid first stage esterification are further reacted in a second stage at a temperature of 250° C. under a reduced pressure of less than 1 mm Hg over a period of 2 hours to complete polycondensation. The polymer so prepared has an intrinsic viscosity of 0.9 dl/g.

EXAMPLE 1

The procedure for esterification described in Comparative Example A is repeated three times, each time adding as a salt catalyst component, respectively, one of the following: 0.25 g of dipotassium terephthalate, 0.25 g of potassium chloride, 0.25 g of sodium stearate. In the case where dipotassium terephthalate is used, after 82 minutes of esterification, the distillate (56.1 g) contains 10.4 g tetrahydrofuran. In the case where potassium chloride is used, after 86 minutes of esterification, the distillate (56.4 g) contains 12.2 g tetrahydrofuran. In the case of sodium stearate being used, after 90 minutes of esterification, the distillate (52.2 g) contains 10.8 g tetrahydrofuran.

COMPARATIVE EXAMPLE B

The procedure for esterification of Comparative Example A is repeated and 0.125 g of tributyltin acetate is added as an additional organo-metallic catalyst component. No salt catalyst component is used. All of the other conditions remain the same. After the esterification has been conducted for 71 minutes, the distillate (53.9 g) contains 12.2 g tetrahydrofuran.

EXAMPLE 2

The procedure for esterification of Comparative Example A is repeated and 0.125 g of tributyltin acetate, and 0.0125 g of dipotassium terephthalate is added, as the organo-metallic and salt catalyst components, respectively, with all of the other conditions remaining the same. After the esterification has been conducted for 85 minutes, the distillate (57.1 g) contains 10.8 g tetrahydrofuran.

EXAMPLE 3

The procedure for esterification of Comparative Example A is repeated and 0.125 g of tributyltin acetate and 0.0125 g of sodium bicarbonate are added as the organo-metallic and salt catalyst components, with all of the other conditions remaining the same. After the esterification is conducted for 87 minutes, the distillate (51.4 g) contains 10.6 g tetrahydrofuran.

COMPARATIVE EXAMPLE C

The procedure for esterification of Comparative Example A is repeated, except that 0.5 g of tributyltin acetate is added. All the other conditions remain the same. After the esterification has been conducted for 80 minutes, the distillate (57.9 g) contains 13.5 g of tetrahydrofuran. This example is based on U.S. Pat. No. 4,346,213, col. 4, Table III, Example 10.

COMPARATIVE EXAMPLE D

The procedure for esterification of Comparative Example A is repeated, except that 7.884 g of tributyltin acetate is added. All the other conditions remain the same. After the esterification has been conducted for 82 minutes, the distillate (58.6 g) contains 14.3 g of tetrahydrofuran. This example is based on U.S. Pat. No. 4,346,216, col. 4, and U.S. Pat. No. 4,439,597, col. 5, Table III, Example 4.

EXAMPLE 4

The procedure for esterification of Comparative Example C is repeated, except that 0.5 g of dipotassium terephthalate is added as the salt catalyst component. After the esterification has been conducted for 93 minutes, the distillate (62.7g) contains 10.64 g of tetrahydrofuran.

The results of the esterification runs are summarized in the Table below:

TABLE

| Example | Ti(OBu)$_4$ | Bu$_3$SnOAc | K$_2$TP | NaSt | KCl | NaHCO$_3$ | Amount of THF Reduced (%) | Amount of Conversion Increased (%) |
|---|---|---|---|---|---|---|---|---|
| A | * | | | | | | 0 | 0 |
| 1-1 | * | | | * | | | 4.8 | 9 |
| 1-2 | * | | | | * | | 2.6 | 5 |
| 1-3 | * | | | | | * | 1.7 | 7 |
| B | * | * | | | | | 0.7 | −1 |
| 2 | * | * | * | | | | 4.3 | 8 |
| 3 | * | * | | | | * | 2.8 | 4 |
| C | * | * | | | | | 0.2 | 6 |
| D | | * | | | | | −1.1 | 3 |
| 4 | * | * | * | | | | 6.3 | 19 |

As these data demonstrate, the formation of tetrahydrofuran is reduced and the percentage of conversion is increased in Examples 1-1, 1-2, 1-3, 2, 3, and 4, which are conducted by the method of the present invention.

The data shown in the Table merely represent the effect of two kinds of organic acid salts and two kinds of inorganic salts, but it will be understood that many other equivalent salts, as defined above, can be used.

What is claimed is:

1. A process for preparing a poly(butylene terephthalate) comprising: esterifying in a first stage terephthalic acid with 1,4-butanediol in the presence of a catalyst having an organo-metallic component containing from 0.001 to 0.5 wt. % of at least one of an organo-tin compound and an organo-titanium compound and a salt component containing from 0.001 to 0.5 wt. % of at least one of organic acid salts and inorganic salt, the weight percentages being based on the weight of terephthalic acid; and thereafter, when the percentage of conversion of the esterification reaches from 70 to 95%, polycondensing in a second stage the reaction product at an increased reaction temperature and at a reduced pressure to form poly(butylene terephthalate).

2. The process of claim 1 wherein the terephthalic acid and 1,4-butanediol contain, respectively, a copolycondensable polycarboxylic acid and a copolycondensable polyol.

3. The process of claim 2 wherein the additional copolycondensable polycarboxylic acid is selected from isophthalic acid, adipic acid, sebacic acid, azelaic acid, dodecane dicarboxylic acid, hexahydroterephthalic acid, trimellitic acid, trimesic acid and 2,6-naphthalene dicarboxylic acid.

4. The process of claim 2 wherein the additional copolycondensable polyol is selected from ethylene glycol, neopentyl glycol, pentaerythritol, 1,6-hexanediol, polyethylene glycol and polytetramethylene ether glycol.

5. The process of claim 1 wherein the organo-titanium compound has the formula Ti(OR)$_4$, where R is an alkyl group having from 1 to 30 carbon atoms, an aryl group having from 6 to 12 carbon atoms, or the partially or completely hydrolyzed or transesterified product of said alkyl or aryl group, said Rs being the same or different from one another.

6. The process of claim 1 wherein said organo-tin compound is tributyltin acetate, triethyltin hydroxide or dibutyltin oxide.

7. The process of claim 1 wherein said organic acid salt has the formula R(COO)$_n$M, where R is an alkyl group having from 1 to 30 carbon atoms or an aryl group having from 6 to 12 carbon atoms, n is 1 to 4, and M is a group IA or a group IIA metal ion.

8. The process of claim 7 wherein n is 1 or 2.

9. The process of claim 1 wherein said inorganic salt is selected from a group IA or a group IIA metal halide, bicarbonate, carbonate, dihydrogen phosphate, hydrogen phosphate, or phosphate.

10. The process of claim 1 wherein the molar ratio of 1,4-butanediol to terephthalic acid is from 1.2:1 to 2.0:1.

11. The process of claim 10 wherein the molar ratio is from 1.5:1 to 1.8:1.

12. The process of claim 1 wherein the ratio of the organo-metallic catalyst component to the salt catalyst component is from 1:1 to 60:1.

13. The process of claim 12 wherein the organo-metallic catalyst component contains both an organo-titanate and an organo-tin compound in a ratio of from 1:1 to 30:1.

14. The process of claim 12 wherein the organo-metallic component is an organo-titanate.

15. The process of claim 12 wherein the organo-metallic component is an organo-tin compound.

16. The process of claim 1 wherein the first stage temperature is from 180° to 230° C.

17. The process of claim 16 wherein the first stage temperature is from 200° to 210° C.

18. The process of claim 1 wherein the second stage polycondensation temperature is from about 235° to 260° C. and the pressure is from 0.5 to 2 mm Hg.

19. The process of claim 18 wherein the polycondensation temperature is from about 245° to about 255° C.

* * * * *